3,358,054
GRAFT COPOLYMERS OF VINYL CHLORIDE ONTO ETHYLENE-VINYL ESTER COPOLYMERS
Dietrich Hardt, Bonn, and Herbert Bartl, Cologne-Stammheim, Germany, assignors to Farbenfabriken Bayer Aktiengesellschaft, Leverkusen, Germany, a German corporation
No Drawing. Filed Aug. 30, 1963, Ser. No. 305,854
Claims priority, application Germany, Sept. 4, 1962, F 37,742
7 Claims. (Cl. 260—878)

The present invention relates to specific vinyl chloride graft copolymers especially polyvinylchloride containing such specific graft copolymers as well as a process for preparation of these materials.

It is known that graft copolymers can be formed by polymerising vinyl compounds in the presence of other compounds of high molecular weight, which copolymers differ to a more or less large extent in their properties from the homopolymers and from copolymers of corresponding monomer compositions. Nevertheless, such graft polymers do not always produce advantages as regards their properties by comparison with the homopolymers or even copolymers. On the contrary, it has been found that the disadvantages of graft polymers generally so outweigh their advantages that hitherto only a small number of graft copolymers have actually acquired practical importance. Experiments have also already been conducted with vinyl chloride for producing graft polymers, for example with polystyrene, or alternatively for grafting other monomers such as vinyl acetate on to polyvinyl chloride. These products also do not show any particular advantages by comparison with pure polyvinyl chloride.

In contrast hereto, it has now been found that high-grade polymers of vinyl chloride can be produced from vinyl chloride polymers containing graft copolymers if vinyl chloride is polymerised with free radicals in the presence of copolymers of ethylene and vinyl esters.

More especially to be considered as ethylene-vinyl ester copolymers for the present process are those containing low alkyl or aryl radicals in the vinyl ester fraction, advantageously those with an alkanoate radical containing 2-6 carbon atoms. Examples are copolymers of ethylene with vinyl acetate, vinyl propionate, vinyl butyrate or vinyl benzoate.

It is possible to achieve particularly good properties of the types of graft polymer which can be obtained, copolymers of ethylene with vinyl acetate are used, in which the vinyl acetate content of the copolymer amounts to 20–80%, advantageously 30–70%. Furthermore, it has proved to be particularly desirable not to use any ethylene-vinyl acetate copolymers which are of extremely high or extremely low molecular weight, but those with a solution viscosity ($\eta$) of 0.2–1.5.

As well as the vinyl chloride to be polymerised, it is in principle also possible concurrently to employ subordinate quantities of other polymerisable monomers, especially vinyl monomers, such as vinyl ester, methacrylic or acrylic acid esters, acrylonitrile, and also fumaric or maleic acid esters and the like.

In the polymerisation mixtures, it is possible to use 0.5–99 parts by weight of the vinyl chloride which is to be polymerised to one part by weight of ethylene-vinylester copolymer. Advantageously 85–96 parts by weight of vinyl chloride are polymerised to 4–15 parts by weight of ethylene-vinylacetate copolymers. It should be borne in mind in this connection that with incomplete conversion of the vinyl chloride, the proportions of ethylene-vinyl ester copolymer in the final product are higher than in the original polymerisation mixture.

Vinyl chloride polymers containing graft copolymers and having an ethylene-vinyl ester graft copolymer proportion which corresponds to an ethylene-vinyl ester copolymer proportion of 5 to 10% by weight are of particular interest.

In connection with the graft polymerisation and the homopolymerisation of the vinyl chloride, which homopolymerisation usually occurs concurrently to a certain degree, the procedure adopted can be for the ethylene-vinyl ester copolymers to be initially supplied in the form of a latex and for the vinyl chloride in emulsion form of a latex and for the vinyl chloride in emulsion form to be added by polymerisation. On the other hand, the ethylene-vinyl ester copolymer can however also be dissolved in solvents jointly with vinyl chloride. Examples of solvents are primary or tertiary, low molecular weight aliphatic alcohols with at least two carbon atoms (such as ethanol or tertiary butanol), and also tetrahydrofuran or cycloaliphatic and aromatic hydrocarbons (such as cyclohexane and benzene), as well as finally ketones such as acetone. Finally, it is also possible for the ethylene-vinyl ester copolymer to be introduced in finely divided form in the monomeric vinyl chloride. However, this latter procedure is only possible with copolymers having a vinyl acetate proportion which is below 25%. According to a preferred embodiment of the process, however, the ethylene-vinyl ester copolymers, together with a monomer-soluble radical former, are dissolved in monomeric vinyl chloride and this solution, after dispersion in an aqueous medium under the generally usual conditions of a suspension polymerisation of the vinyl chloride, is polymerised in aqueous dispersion with the aid of suitable dispersion auxiliaries, such as gelatine, polyvinyl alcohol or methyl cellulose. According to the last-mentioned procedure, the highest possible degrees of grafting can be obtained.

Suitable as polymerisation initiators are radical formers which are soluble in monomers and also those which are water-soluble, as for example organic peroxides such as lauroyl peroxide, benzoyl peroxide, peroxydicarbonates and others, and readily decomposable nitrogen compounds such as $\alpha,\alpha$-azodiisobutyronitrile. The initiators which are soluble in the monomer are preferably used in a suspension polymerisation process, whereas the water-soluble initiators (more especially persulphates or also hydrogen peroxide), optionally in the presence of reducing agents such as sodium pyrosulphite or small quantities of heavy metal salts, are particularly suitable for polymerisation in emulsion.

These polymerisation initiators are used in quantities from 0.05–about 3%, preferably from 0.1–3% by weight, based on polymerising monomer.

The polymerisation temperatures are within the usual range for the polymerisation of vinyl chloride, advantageously between 20 and 80° C.

Usual polymerisation regulators, such as dodecylmercaptane, halogenated hydrocarbons, aldehydes or ketones may be applied.

When polymerisation is carried out according to this process, there is obtained a graft polymer of vinyl chloride with the ethylene copolymer and, depending on the added quantity of ethylene-vinyl ester copolymer, this can still contain pure polyvinyl chloride and has considerable advantages over polyvinyl chloride or even corresponding vinyl chloride copolymers. To be mentioned as a particular advantage is a considerable improvement in the notch-impact strength, which can rise from about 3 cmkp./cm.$^2$ with vinyl chloride homopolymers to 50 cmkp./cm.$^2$ with the vinyl chloride polymers produced according to the invention. Another outstanding advantage is the greater extensibility of the polymers claimed, this being combined with a greater flexibility measured in xylene of the moulded elements manufactured therefrom.

A mixture of polyvinyl chloride and the graft copolymers can be processed very much more easily than pure polyvinyl chloride, for example when it is desired that other additives such as stabilisers, pigments or other compounds of high molecular weight should be incorporated on the roller.

Furthermore, the mixture of polyvinyl chloride and the graft copolymer is so compatible that the homogeneous moulded elements manufactured therefrom are transparent. It is also possible to produce crystal-clear, plasticizer-free foils which (if the ethylene-vinylester is higher than 15%) can be stretched and which are also able to shrink again at high temperature, so that they are particularly suitable for the production of shrinkable foils for wrapping purposes. On the contrary graft copolymers of other monomers such as styrene on ethylene-vinyl acetate copolymers produce nontransparent, brittle masses of poor quality.

The properties of the polymerisation products are strongly influenced by the proportion of the grafted ethylene-vinyl acetate copolymer. The higher this proportion, i.e. between about 15 and 66 percent by weight, the greater is the elasticity and elongation of the products increased, so that they are very suitable for the production of foils and coatings. It was found to be particularly surprising that very small proportions of ethylene-vinyl acetate graft polymer, corresponding to a quantity between 4 and 15% by weight of ethylene-vinyl acetate copolymer in the final product, already provide a very considerable improvement in the notched-impact strength without the hardness of the polymer mixture being appreciably reduced by comparison with pure polyvinyl chloride. Whereas the notched-impact strength of unmodified polyvinylchloride is about 2.8 kpcm./cm.$^2$ we obtained values of the order of magnitude of 20–30 kpcm./cm.$^2$. At the same time a ball indentation hardness of about 1000 kp./cm.$^2$ is maintained.

Under the polymerisation conditions according to the invention, graft copolymers of vinyl chloride on ethylene-vinyl ester copolymers are obtainable which, as shown from extraction experiments according to Example 1, can contain more or less large proportions of polyvinyl chloride, depending on the added quantity of ethylene-vinyl acetate copolymer. Polyvinyl chloride or small quantities of ethylene-vinyl acetate copolymers can optionally also be added to the polymerisation products. The graft copolymerisation can also be carried out under such conditions that the final product also contains unmodified ethylene-vinyl acetate copolymer as well as the polyvinyl chloride and the graft copolymer.

The polymerisation products produced according to the invention are excellently suitable for the production of moulded elements such as plates, compressed elements tubes, containers, foils, fibres or also for coatings. Products having a high impact strength are suitable for production of tubes, injection moulding articles, covering panels, containers, whereas the elastic types of our products are suitable for making foodstuff wrapping foils, conveyor belts, coatings especially on textile materials, shrinking foils, tiles etc.

The parts indicated in the following examples are parts by weight, unless otherwise mentioned.

*Example 1*

A stirrer-type autoclave is charged with 150 parts of an ethylene-vinyl acetate copolymer with a solution viscosity ($\eta$)=0.95 (measured in xylene) and a vinyl acetate content of 45%, 3,300 parts of water, 3 parts of $\alpha,\alpha$-azo-diisobutyronitrile, 5 parts of polyvinyl alcohol and 1,350 parts of vinyl chloride. Stirring takes place for 5 hours at room temperature in order to dissolve the copolymer in the vinyl chloride and polymerisation thereafter takes place for 15 hours at 60° C.

There are obtained 1,380 parts (92%) of a finely dispersed product which contains 11% of ethylene-vinyl acetate copolymer fractions. Drying takes place at 60° C. in vacuo.

The K-value is 51.

From the polymer, it is possible to cast transparent foils or also to produce moulded elements, in connection with which the following mechanical values were measured:

Tensile strength according to DIN 53504, kp./cm.$^2$ — 330
Elongation, percent — 135
Notch-impact toughness at room temperature according to DIN 53453 kp.-cm./cm.$^2$ — 42.6

Considerable quantities of vinyl chloride have been grafted on to the ethylene-vinyl acetate copolymer introduced, as will be apparent from extraction and solubility tests in combination with elementary analysis. Samples of the polymer obtained in accordance with the aforementioned mixture were extracted in one case with tertiary butanol, a solvent for ethylene-vinyl acetate copolymer, and another case with a mixture of tertiary butanol and benzene (1:1), the extraction lasting for 48 hours. The analysis results of the extract are shown in the following table:

| Extraction medium | Oxygen, percent | Chlorine, percent | Extracted quantity in percent | Solubility tert. | |
|---|---|---|---|---|---|
| | | | | Benzene | Butanol |
| Tert.-butanol extract | 9.7 | 15.0 | 0.22 | Soluble | Soluble. |
| Tert.-butanol/benzene 1:1 extract | 9.9 | 20.75 | 3.3 | Soluble | Substantially insoluble. |
| Ethylene vinyl acetate copolymer | 16.8 | | | | |

The extracts contain oxygen and chlorine and thus the copolymer is not an ethylene-vinyl acetate copolymer; this result is further supported by the discovery that the extracts are homogeneous and are not capable of being dissolved in tertiary butanol. As the extract is soluble in benzene, it can be assumed that the extract does not contain polyvinyl chloride, since the latter is insoluble in benzene. The extracts are considered to be particularly readily soluble proportions of the graft copolymer which are of low molecular weight and have a high oxygen content.

*Example 2*

In a stirrer-type autoclave, 300 parts of an ethylene-vinyl acetate copolymer with 45% of vinyl acetate (solution viscosity ($\eta$)=0.95), 3,300 parts of water, 5 parts of polyvinyl alcohol, 3 parts of $\alpha,\alpha'$-azo-diisobutyronitrile and 1200 parts of vinyl chloride are stirred for 5 hours at room temperature and thereafter heated for 15 hours to 60° C.

It is also possible initially to produce the solution of ethylene-vinyl acetate in vinyl chloride inside the autoclave by stirring for several hours at room temperature and then forcing in the other constituents, or to force the prepared solution of the copolymer in vinyl acetate from a second dissolving autoclave into the aqueous phase and to start polymerisation immediately. There are obtained 1260 parts (84%) of finely dispersed polymer. It contains 24% of ethylene-vinyl acetate copolymer and the K-value is 57.

It is possible from the product to produce transparent foils having high strength values and breaking elongation values, which foils can be stretched and have an almost 100% shrinkage on heat treatment.

Tensile strength according to DIN 53504, kp./cm.² _ 235
Elongation in percent _____ 257

*Example 3*

A stirrer-type autoclave is charged with 75 parts of a vinyl acetate copolymer, of which the vinyl acetate content is 30%, 3300 parts of water, 5 parts of polyvinyl alcohol, 3 parts of α,α-azodiisobutyronitrile and 1425 parts of vinyl chloride. The closed autoclave is stirred for 5 hours at room temperature and thereafter heated for 15 hours to 60° C.

The product consisting of small, colourless beads is washed in water and dried in vacuo at 60° C. A yield of 1320 parts (88%) is obtained and the K-value is 56.

The polymer contains 5.7% of ethylene-vinyl acetate copolymer. The mechanical test shows an excellent notch-impact toughness, by comparison with polyvinyl chloride, without the ball indentation hardness being appreciably impaired.

There are obtained 1300 parts (86.5%) of a colorless polymer in the form of fine beads, which is washed with water and dried at 50° C. in vacuo. The polymer contains 58% ethylene/vinylacetate.

Solutions of the polymer in tetrahydrofurane-acetone or cyclohexanone can be used to produce transparent flexible films by casting. The material is excellently suitable for producing plasticizer-free foils and for coating textiles.

*Example 6*

1500 parts of a ethylene-vinylacetate copolymer with a vinylacetate content of 30%, 1500 parts of vinylchloride, 6600 parts of water, 30 parts of methylcellulose, 1 part of a long-chain paraffin sulfonate and 6 parts of azodiisobutyric acid nitrile are vigorously stirred in an autoclave for 5 hours at 20° C. in order to dissolve the copolymer in the vinylchloride. The polymerisation then takes place for 15 hours at 60° C. There are obtained 2580 parts=86% of a finely dispersed polymer consisting of 58% ethylenevinylacetate and 42% vinylchloride. The soft, flexible material is useful in the production of foils or, in admixture with fillers, in the production of floor coverings. The tensile strength is 178 kg./cm.²; elongation 390%.

| Product | Tensile strength according to DIN 53504, kp./cm.² | Elongation, Percent | Notch impact toughness at room temperature according to DIN 53453, kp.-cm./cm.² | Ball indentation hardness after 10 and 60 seconds according to DIN 53456, kp./cm.² |
|---|---|---|---|---|
| 3 | 360 | 74 | 20.0 | 1,085/1,045 |
| Polyvinyl chloride | 610 | 80 | 2.8 | 1,135/1,070 |

*Example 4*

In accordance with the procedure of Example 1, 75 parts of an ethylene-vinyl acetate copolymer with a content of 66% of vinyl acetate and a solution viscosity ($\eta$)=0.72, 3300 parts of water, 5 parts of polyvinyl alcohol, 3 parts of α,α-azodiisobutyronitrile and 1425 parts of vinyl chloride are stirred for 5 hours at room temperature and thereafter heated for 15 hours to 60° C. There are obtained 1360 parts (90%) of a finely divided, colourless graft polymer, which is dried at 60° C. in vacuo. It contains 5.5% of ethylene-vinyl acetate copolymer proportions and can be processed to form transparent moulded elements with high notch-impact toughness and ball indentation hardness.

*Example 7*

A stirrer-type autoclave is charged with 600 parts of a copolymer of ethylene and vinylacetate, having a vinylacetate content of 30%, 900 parts of vinylchloride, 3300 parts of water, 10 parts of methylcellulose and 3 parts of azodiisobutyric acid nitrile as catalyst. The mixture is stirred for 5 hours at room temperature in order to completely dissolve the copolymer. Polymerisation is then effected for 15 hours at 60° C. There are obtained 1430 parts of a finely dispersed polymer consisting of 42% ethylene/vinylacetate and 58% vinylchloride. Test samples show a tensile strength of 203 kg./cm.² and a breaking elongation of 163%. The product can be used for producing foils or, in admixture with fillers, for producing floor coverings.

| Product | Tensile strength according to DIN 53504, kp./cm.² | Elongation Percent | Notch impact toughness at room temperature according to DIN 53453, kp.-cm./cm.² | Ball indentation hardness after 10 and 60 seconds according to DIN 53456, kp./cm.² |
|---|---|---|---|---|
| 4 | 351 | 53 | 17.1 | 1,030/965 |
| Polyvinyl chloride | 610 | 80 | 2.8 | 1,135/1,070 |

*Example 5*

An autoclave is charged with 750 parts of an ethylene-vinylacetate copolymer with a vinylacetate content of 45%, 750 parts of vinylchloride, 3300 parts of water, 10 parts of methylcellulose and 3 parts of α,α-azodiisobutyronitrile. The mixture is vigorously stirred for 5 hours at room temperature in order to dissolve the copolymer in the vinylchloride. Polymerisation is then effected for 20 hours at 60° C.

*Example 8*

150 parts of a copolymer of ethylene and vinylacetate, having a vinylacetate content of 30%, 1350 parts of vinylchloride, 3300 parts of water, 10 parts of methylcellulose and 3 parts of azodiisobutyric acid nitrile are stirred in an autoclave for 5 hours at room temperature. The mixture is subsequently heated to 60° C. for 15 hours to effect polymerisation. A polymer is obtained in the form of fine beads in yield of 84.5%, having an ethylene/ vinylacetate content of 12%. The material has a tensile strength of 312 kg./cm.$^2$ and a breaking elongation of 34%. The notch impact strength is 30.6 kg./cm.$^2$. Masses of high impact resistance can be obtained without difficulty by extrusion or calendering without the addition of a plasticizer.

*Example 9*

1800 parts of an ethylene-vinylacetate copolymer with a vinylacetate content of 45%, 1200 parts of vinylchloride, 6600 parts of water, 30 parts of methylcellulose, 1 part of a long-chain paraffin sulfonate and 5 parts lauroylperoxide are vigorously stirred for 5 hours in an autoclave. Polymerisation is then effected for 15 hours at 65° C. with rapid stirring. 2640 parts=88% of a finely dispersed polymer consisting of 68% ethylene/vinylacetate and 32% vinylchloride are obtained. The product is soft and flexible and can be used to produce foils, cable insulations, coatings and floor coverings. The tensile strength is 173 kg./cm.$^2$, the breaking elongation 471%. The material does not break when subjected to a notch impact-bending test.

*Example 10*

1500 parts of a copolymer of ethylene and vinylacetate, having a vinylacetate content of 45%, 1400 parts of vinylchloride, 6600 parts of water, 1 part of a long chain paraffin sulfonate, 30 parts of methylcellulose and 6 parts of diisoproplyperoxide dicarbonate are stirred in an autoclave for 5 hours at room temperature. The peroxide is introduced under pressure into the autoclave together with another quantity of 100 parts vinylchloride wherein the peroxide is dissolved. After the addition of the peroxide the mixture is stirred for another hour at room temperature and polymerisation is then effected for 15 hours at 40° C. 2585 parts of a pearl polymer with a K-value of 91, consisting of 58% ethylene/vinylacetate and 42% vinylchloride, is obtained. The tensile strength is 223 kg./cm.$^2$, the elongation 294%. The soft, highly elastic material can be used to produce foils, cable insulations and protective coatings against corrosion.

*Example 11*

2.8 parts of a copolymer of ethylene and vinylacetate, having a vinylacetate content of 45%, 6 parts of vinylchloride, 20 parts of water, 0.018 part of azodiisobutyronitrile and 0.06 part of methylcellulose are stirred in an autoclave for 5 hours at room temperature and subsequently heated for 15 hours to 60° C. with vigorous stirring. 8.4 parts of a finely dispersed colorless graft polymer containing 33% ethylene/vinylacetate are obtained. The tensile strength is 212 kg./cm.$^2$, the breaking elongation 257%. The material does not break when subjected to a notch impact test.

*Example 12*

A stirrer-type autoclave is charged with 4.5 parts of a copolymer of ethylene and vinylacetate, having a vinylacetate content of 45%, 25.3 parts of vinylchloride, 66 parts of water, 0.04 part of benzoylperoxide and 0.06 part of polyvinylalcohol. The autoclave is then closed and the content is stirred for 5 hours at room temperature. Polymerisation is then effected for 15 hours at 65° C. with vigorous stirring. 26.5 parts=86% of a finely dispersed material consisting of 17% ethylene/vinylacetate and 83% polyvinylchloride are obtained. The product which can be extruded and injection moulded, does not break when subjected to a notch impact bending test. The tensile strength is 280 kg./cm.$^2$, the breaking elongation 207%. The material can be used to produce bodies of high impact strength by extrusion or injection moulding.

*Example 13*

A stirrer-type autoclave is charged with 2.2 parts of a copolymer of ethylene and vinylacetate, having a vinylacetate content of 45%, 27.6 parts of vinylchloride, 66 parts of water, 0.06 part of polyvinylalcohol, 150 parts $K_2HPO_4$ and 0.06 part of azodiisobutyric acid nitrile. The mixture is subsequently vigorously stirred for 5 hours at room temperature in order to dissolve the ethylene/vinylacetate copolymer in the vinylchloride. Polymerisation takes place for 20 hours at 60° C. The autoclave contains 29 parts=97.5% of a finely dispersed graft copolymer which is washed with water and dried at 60° C. The product contains 7.6% ethylene/vinylacetate and 92.4% polyvinylchloride. The product can be made into bodies by extruding and injection moulding and is distinguished by a high notch impact strength. Tensile strength 376 kg./cm.$^2$, elongation 97%, notch impact strength 29.6 kg./cm.$^2$.

*Example 14*

750 parts of an ethylene/vinylacetate copolymer with a vinylacetate content of 66%, 750 parts of vinylchloride, 3300 parts of water, 10 parts of methylcellulose and 3 parts of azodiisobutyric acid nitrile are stirred in an autoclave for 5 hours at 60° C. 1300 parts of a finely dispersed polymer consisting of 58% ethylene/vinylacetate and 42% vinylchloride are obtained. The soft and flexible product has a K-value of 46 and can be used for producing foils and floor coverings. The tensile strength is 193 kg./cm.$^2$, the elongation 340%.

*Example 15*

300 parts of a copolymer of ethylene and vinylacetate, having a vinylacetate content of 66%, 1200 parts of vinylchloride, 3300 parts of water, 30 parts of gelatine and 3 parts of azodiisobutyric acid nitrile are thoroughly stirred in an autoclave for 5 hours at 60° C. with vigorous stirring. 1395 parts of a finely dispersed, colorless polymer consisting of 21.5% ethylene vinylacetate and 88.5% vinylchloride are obtained. The tensile strength is 289 kg./cm.$^2$, the elongation 220%.

*Example 16*

A stirrer-type autoclave is charged with 4,500 parts of a copolymer of ethylene and vinylacetate, having a vinylacetate content of 66%, 4500 parts of vinylchloride, 20,000 parts of water, 60 parts of methylcellulose, 2 parts of a long-chain paraffin sulfonate, 120 parts of trichloroethylene as control agent and 20 parts of lauroylperoxide. The mixture is vigorously stirred for 5 hours at room temperature in order to dissolve the ethylene/vinylacetate copolymer in the organic phase. Polymerisation is then effected for 20 hours at 65° C. 7925 parts of a polymer are obtained in the form of fine beads, consisting of 56.5% ethylene/vinylacetate copolymer and 43.5% polyvinylchloride. The K-value is 62.

If the aforesaid reaction is carried out without trichloroethylene a product of equal composition is obtained. The K-value of this product was found to be 76.8. A decrease of the K-value is accompanied by an improvement of the solubility and the processing properties

*Example 17*

450 parts of an ethylene/vinylacetate copolymer with a vinylacetate content of 70%, 1050 parts of vinylchloride. 3300 parts of water, 20 parts of methylcellulose and 3 parts of azodiisobutyric acid nitrile are vigorously stirred in an autoclave for 5 hours at room temperature. Polymerisation then takes place for 15 hours at 60° C. After washing with water and drying 1290 parts=86% of a finely dispersed colorless polymer consisting of 35% ethylene/vinylacetate and 65% vinylchloride are obtained. The tensile strength is 262 kg./cm.$^2$, the elongation 228%. The material is excellently suitable in the production of foils.

*Example 18*

75 parts of a copolymer of ethylene and vinylacetate, having a vinyl acetate content of 80%, 1425 parts of vinylchloride, 3300 parts of water, 20 parts of methylcellulose, 0.5 part of a long-chain paraffin sulfonate and 3 parts of azodiisobutyric acid nitrile are stirred in an autoclave for 5 hours at room temperature. Polymerisation is then effected for 5 hours at 60° C. The finely dispersed polymer is obtained in a yield of 88.5% and consists of 5.6% ethylene vinylacetate and 94.4% vinylchloride. The tensile strength is 518 kg./cm.$^2$, the elongation 50%, the ball indentation hardness 1270/1180 kg./cm.$^2$, the flexural stress at a given deflection was found to be 994 (DIN 53452). As compared with polyvinyl chloride the ball indentation hardness and said flexural stress is increased by 10–15%.

*Example 19*

A mixture of 750 parts of an ethylene/vinylacetate copolymer with a vinylacetate content of 80%, 750 parts of vinylchloride, 3300 parts of water, 20 parts of methylcellulose, 0.5 part of a long-chain paraffin sulfonate and 3 parts of azodiisobutyric acid nitrile are vigorously stirred in an autoclave for 5 hours at room temperature. The temperature is then raised for 15 hours to 60° C. 1300 parts=86.7% of a colorless, soft polymer consisting of 58% ethylene vinylacetate and 42% vinylchloride are obtained. The material can be used for producing e.g. foils and cable insulations.

*Example 20*

2070 parts of an ethylene/vinylacetate copolymer latex with a solids content of 25% and a vinylacetate content of 48% in the copolymer which contains 9.4% sulfated alkylphenolpolyglycol ether as emulsifier and has a pH value of 9, are polymerised in a stirrer-type autoclave with the addition of 520 parts vinylchloride and 3 parts of potassium peroxide disulfate for 15 hours at 55° C. There is obtained an entirely coagulate-free latex (2530 parts) with a solids content of 36.2%. The graft polymer consists of 51% polyvinylchloride and 49% ethylene/vinylacetate of the aforesaid composition. The K-value is 60.4.

The latex is suitable for impregnating textiles, finishing paper and fibre fleeces.

What is claimed is:

1. A graft copolymer comprising vinyl chloride grafted onto a copolymer of ethylene and a vinyl ester, said ethylene/vinyl ester copolymer containing from 20 to 80% by weight of a vinyl ester selected from the group consisting of vinyl alkanoate containing 2–6 carbon atoms in said alkanoate moiety and vinyl benzoate and the ratio by weight of vinyl chloride to said ethylene/vinyl ester copolymer in said graft copolymer being 0.5 to 99 parts by weight of vinyl chloride for each part by weight of said ethylene/vinyl ester copolymer.

2. The graft copolymer of claim 1 wherein said ethylene/vinyl ester copolymer has a solution viscosity measured in xylene of 0.2 to 1.5.

3. The graft copolymer of claim 1 wherein said ratio by weight is from 85 to 96 parts by weight of vinyl chloride for each part by weight of said ethylene/vinyl ester copolymer.

4. A graft copolymer comprising vinyl chloride grafted onto a copolymer of ethylene and vinyl acetate, said ethylene/vinyl acetate copolymer containing from 20—80% by weight of vinyl acetate and said graft copolymer containing from 4–66% by weight of ethylene/vinyl acetate copolymer.

5. The graft copolymer of claim 4 wherein said ethylene/vinyl acetate copolymer has a solution viscosity measured in xylene of from 0.2 to 1.5.

6. The graft copolymer of claim 4 wherein said graft copolymer contains from 4–15% by weight of ethylene-vinyl acetate copolymer.

7. The graft copolymer of claim 4 wherein said graft copolymer contains from 15–66% by weight of ethylene/vinyl acetate copolymers.

References Cited

UNITED STATES PATENTS

| | | | |
|---|---|---|---|
| 2,733,228 | 1/1956 | Salyer et al. | 260—878 |
| 3,125,545 | 3/1964 | Van Cleve et al. | 260—897 |
| 3,177,270 | 4/1965 | Jones et al. | 260—878 |

GEORGE F. LESMES, *Primary Examiner.*

MURRAY TILLMAN, *Examiner.*

D. J. BREZNER, *Assistant Examiner.*

Notice of Adverse Decision in Interference

In Interference No. 96,629 involving Patent No. 3,358,054, D. Hardt and H. Bartl, GRAFT COPOLYMERS OF VINYL CHLORIDE ONTO ETHYLENE-VINYL ESTER COPOLYMERS, final judgment adverse to the patentees was rendered June 19, 1969, as to claims 1, 3, 4, 6 and 7.

[*Official Gazette September 2, 1969.*]